United States Patent [19]
Soma et al.

[11] 4,090,137
[45] May 16, 1978

[54] SYSTEM FOR COMPENSATING CROSS-POLARIZED WAVES TO ATTENUATE CROSSTALK

[75] Inventors: Shoji Soma; Ikuro Sato, both of Tokyo, Japan

[73] Assignee: Nippon Electric Co., Ltd., Tokyo, Japan

[21] Appl. No.: 663,221

[22] Filed: Mar. 3, 1976

[30] Foreign Application Priority Data

Mar. 3, 1975 Japan .................................. 50-25844

[51] Int. Cl.$^2$ ............................................... H04B 1/00
[52] U.S. Cl. ..................................... 325/60; 325/472; 343/100 PE
[58] Field of Search ........................ 325/21, 22, 42, 46, 325/56, 60, 62, 63, 65, 369, 472, 475, 476; 179/15 AN, 15 BC, 15 BP; 343/176, 100 PE; 333/21 A

[56] References Cited

U.S. PATENT DOCUMENTS

| 3,430,156 | 2/1969 | Katzin ..................... 325/56 |
| 3,500,207 | 3/1970 | Ruthroff .................. 325/60 |
| 3,735,266 | 5/1973 | Amitay .................... 325/60 |
| 3,883,872 | 5/1975 | Fletcher et al. ........ 343/100 PE |
| 3,963,990 | 6/1976 | DiFonzo ................. 325/476 |
| 3,986,123 | 10/1976 | Tirro et al. .............. 325/60 |

Primary Examiner—Robert L. Griffin
Assistant Examiner—Jin F. Ng
Attorney, Agent, or Firm—Ostrolenk, Faber, Gerb & Soffen

[57] ABSTRACT

Polarization distortion experienced by cross-polarized waves is corrected to reduce crosstalk by transmission of pilot signals representing each of the cross-polarized waves, reception of the pilot signals and, based upon their vector values, adjustment of variable phase shifter circuits and variable attenuator circuits to minimize crosstalk effect. Received cross-polarized waves initially undergo phase compensation and are thereafter separated, amplified and then undergo a selected amount of attenuation, based on the received pilot signals, whereupon the attenuated signal of one polarized wave is mixed with the other polarized wave to eliminate the crosstalk components from each of the polarized waves. An additional phase shift adjustment may also be provided for after the cross-polarized waves undergo preamplification. The phase shifting circuits are also adjusted by the control circuits in accordance with the values of the received pilot signals.

Preadjustment of cross-polarized waves may be undertaken prior to transmission thereof so that the overall effect of the adjustment of phase and amplitude prior to transmission and the polarization distortion occurring as a result of transmission offset one another to thereby deliver cross-polarized signals to a receiver in which cross-talk is substantially attenuated without further treatment of the cross-polarized waves at the receiver end. The level of phase and amplitude preadjustment at the transmitter is determined by the receipt of pilot signals from the transmitter of the remote transmitter-receiver in communication therewith.

12 Claims, 12 Drawing Figures

SYSTEM FOR COMPENSATING CROSS-POLARIZED WAVES TO ATTENUATE CROSSTALK

BACKGROUND OF THE INVENTION AND OBJECTS

The invention relates to a system for the compensation of crosstalk caused by distortion in polarization in a dual-polarization microwave transmission system.

In a radio communication system, a frequency spectrum reuse system for effectively utilizing frequencies has been known, in which mutually independent signals are carried by dual orthogonally polarized waves at the same frequency (in the case of linear polarized waves, for example, vertical and horizontal polarized waves, while in the case of circular polarized waves, clockwise and counter-clockwise rotating circular polarized waves) in a microwave region. Thus, the signal frequency band width that can be transmitted through a single microwave carrier is substantially doubled.

In this type of system, the crosstalk level between two polarized waves must be minimized. There are various causes of the deterioration of the cross-polarization discrimination. To mention a few, the feed circuit (including a reflector system for transmitting and receiving antenna and primary radiator) and the propagation path can cause such deterioration.

The cross-polarization induced in the propagation path is mainly due to rain abnormalities. The cross-polarization components generated in this way in the propagation medium abnormalities generally have a time-varying factor, because rain is a natural phenomenon. Especially, the deterioration of the cross-polarization discrimination factor caused by rain is worsened as the amount of rainfall rate is increased, with the harmful effect of the rainfall being worsened as the frequency is increased. The cause of such effects is that rain drops that are lossy are not perfectly spherical in shape but ellipsoidal. Therefore, when polarized waves have their electric fields directed in parallel to the major and minor axes, respectively, of the rain drop, differences in attenuation and phase characteristics are developed between these two polarized waves. In practice, the canting angle of rain drops is not always vertical, and consequently, even if vertical and horizontal linear polarized waves crossing perfectly orthogonally were to be transmitted from a transmitting antenna, the incident polarizations of radio waves not only lose their orthogonality due to the aforementioned different attenuation characteristics of rain drops, but also would generate elliptically polarized waves due to the different phase characteristics, causing degradation of the cross-polarization discrimination. The propagation experiments as well as theoretical analyses have established that the phase characteristics of the rain drops are more harmful than the attenuation characteristics. The well-known examples of the method for compensation for the deterioration of the cross-polarization discrimination caused by rain, are disclosed in the following technical papers:

(1) T. S. Chu "Restoring the Orthogonality of Two Polarizations in Radio Communication Systems, I" B.S.T.J. Vol. 50, No. 9, pp. 3063–3069, November 1971;

(2) T. S. Chu "Restoring the Orthogonality of Two Polarizations in Radio Communication Systems, II" B.S.T.J. Vol. 52, No. 3, pp. 319–327, March 1973; and (3) U.S. Pat. No. 3,735,266 issued May 22, 1973 in the name of Noach Amitary, Livingston; N.J., and assigned to the Bell Telephone Laboratories Incorporated, assignee of the invention.

The compensation method disclosed in technical papers 1 and 2 above is such that a variable phase-shifter and variable attenuator, which are rotatable via rotary joints, are arranged in a feed circuit assembled in an antenna, and when cross-polarization components have been generated in a propagation path due to rainfall, the variable phase-shifter and the variable attenuator are rotated while controlling the amount of phase-shift and the amount of attenuation of these compensation means to improve the orthogonality between the polarized waves and to compensate for the cross-polarization discrimination, thereby producing prefectly orthogonal linear polarized waves. Also, the plane of these dual orthogonal polarizations are changed by means of a polarization converter ($\Delta \pi$) so that the isolation of the dual orthogonally polarized waves is achieved by means of an orthomode transducer. This compensation method is effective in a line of sight repeater communication system. However, in a satellite communication earth station antenna which is required to provide high efficiency and low noise performances, this method has serious disadvantages such that not only is the antenna efficiency degraded but the noise temperature is also increased due to the variable attenuator assembled in the feed circuit, resulting in the degradation of transmission quality.

On the other hand, the compensation method disclosed in technical paper 3 is such that the compensation is not carried out in the antenna feed circuit but all the compensation is achieved electrically in the latter stages of pre-amplifiers 31, 32. Although this compensation method can eliminate the disadvantages of the method disclosed in technical papers 1 and 2, the method still has a disadvantage such that the degree of the cross-polarization improvement is seriously affected by the amplitude and phase vs. frequency characteristics of the pre-amplifier, because the crosstalk due to the differential phase characteristics of rain abnormalities which are a predominant factor of the degradation of the cross-polarization is compensated in the latter stages of the pre-amplifiers.

One object of the present invention is to provide a novel cross-polarization compensation system which is free from the disadvantages present in the prior art system for compensating degradation of a cross-polarization discrimination which is generated in a propagation abnormality such as rainfall.

Another object of the present invention is to provide a novel cross-polarization compensation system in which primary phase adjustment of the cross-polarized waves is accomplished before pre-amplification thereof and in which amplitude correction of the cross-polarized waves is accomplished subsequent to pre-amplification, said adjustments being controlled by the receipt of pilot signals from the facility transmitting the cross-polarized waves.

Still another object of the present invention is to provide a novel cross-polarization compensation system for substantially eliminating crosstalk due to distortion polarization in which phase and amplitude adjustments are made to the cross-polarized waves before transmission thereof so that the overall effect between the phase and amplitude adjustments and the polarization distortion experienced by the cross-polarized waves during propagation thereof, have a cancelling effect upon one another as regards crosstalk components so that the cross-polarized waves need not undergo further treatment at the receiver facility to attenuate crosstalk.

BRIEF DESCRIPTION OF THE FIGURES

Now the invention will be described in more detail with reference to the accompanying drawings, in which:

FIGS. 2a–2d and 3a–3d are schematic diagrams illustrating various states of polarization in the crosstalk compensation systems employing linear polarized waves and circular polarized waves, respectively, which will be used for the explanation of the principle of the present invention.

DETAILED DESCRIPTION OF THE INVENTION

Figure 1:
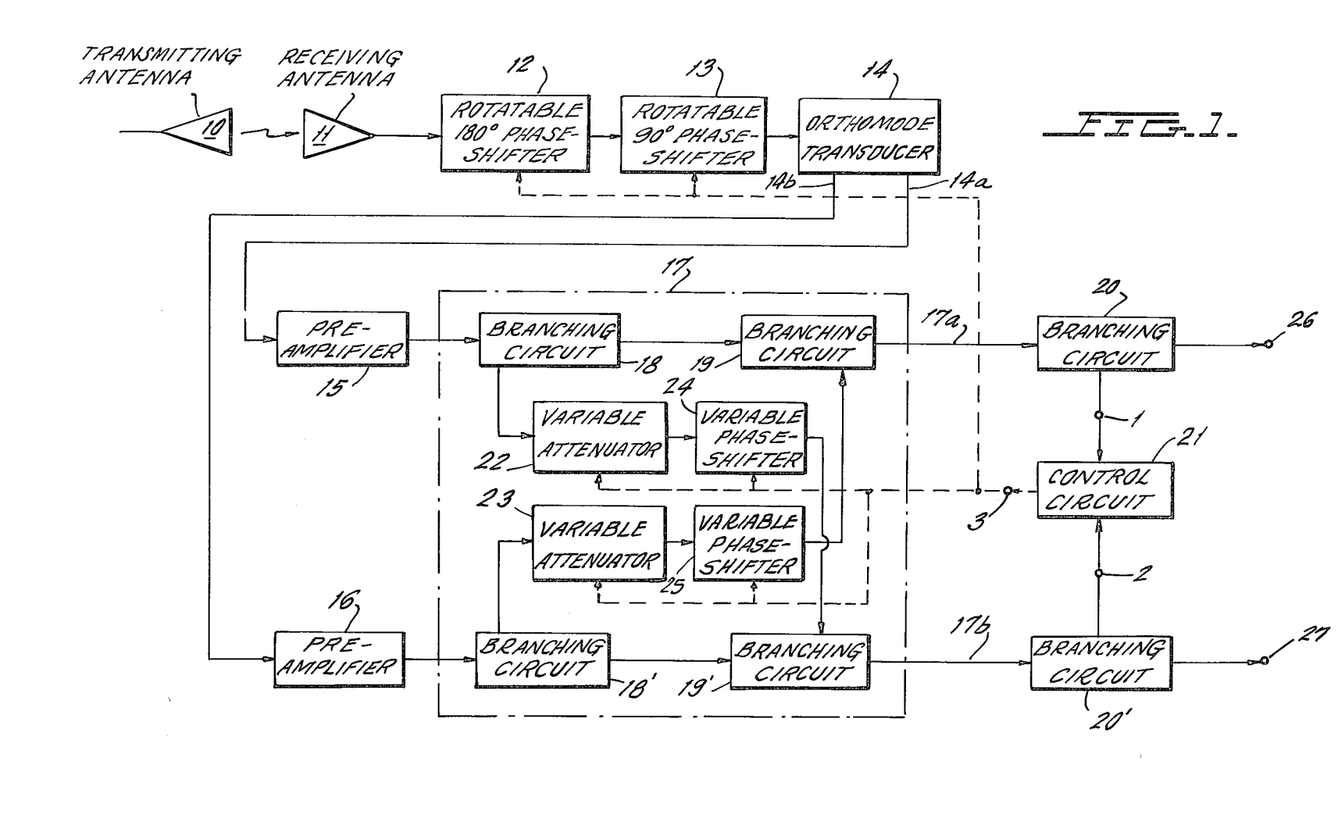
FIG. 1 is a schematic block diagram of a system for compensating crosstalk due to distorted cross-polarized waves according to the present invention.

Referring to FIG. 1, reference numeral 10 designates a transmitting antenna which is incorporated in this figure for convenience of explanation, reference numeral 11, a receiving antenna pointing in the direction of transmitting antenna 10; numeral 12, a 180° phase-shifter disposed in a feed circuit assembled in antenna 11 and having a rotatable connection capability via a rotary joint; numeral 13, a 90° phase-shifter having a rotatable connection capability similar to phase-shifter 12; and numeral 14, an orthomode transducer for isolating two orthogonal polarized waves. The polarized wave signals appearing at its orthogonal polarized wave output terminals 14a and 14b are amplified in pre-amplifiers 15 and 16, respectively, and then fed to two input terminals of a compensation circuit 17. Compensation circuit 17 consists of at least four branching circuits 18, 18', 19 and 19', variable attenuators 22 and 23, and variable phase-shifters 24 and 25, and its outputs 17a and 17b are fed to branching circuits 20 and 20', one of the outputs of each of the respective branching circuits 20 and 20' being fed to control circuit 21, while other outputs are led to output terminals 26 and 27, respectively.

Now the principle of the present invention will be described in more detail with reference to the preferred embodiment shown in FIG. 1 and the vector diagrams in FIGS. 2a–2d.

Figure 2A:
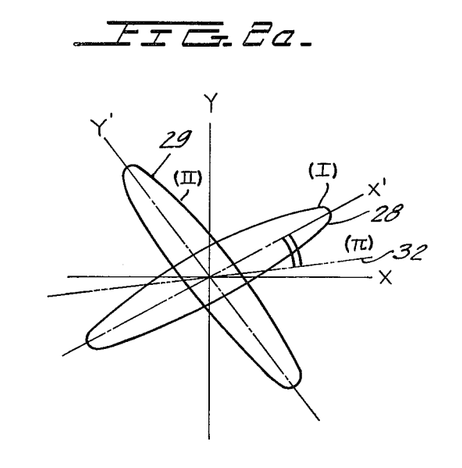
Figure 2B:
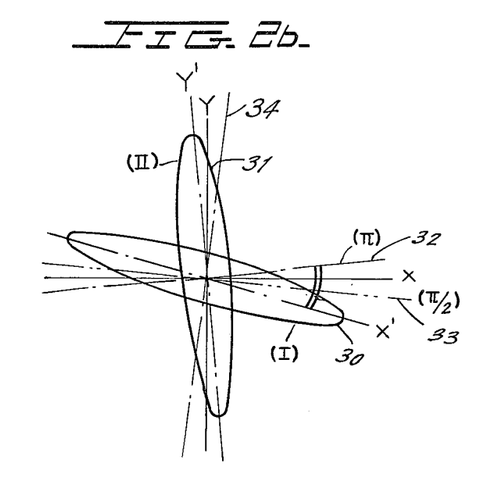

Assuming that two orthogonal linear polarized waves are transmitted from transmitting antenna 10, and propagate through the propagation medium, the orthogonality between two polarized waves fails to be perfectly maintained due to the differential attenuation characteristics of raindrops and the linearly polarized waves are converted to elliptically polarized waves by the differential phase characteristics. Accordingly, clockwise rotating elliptically polarized wave 28 as represented at I in FIG. 2a and counterclockwise rotating elliptically polarized wave 29 as represented at II in FIG. 2a are received by receiving antenna 11. Here the coordinate axes X and Y correspond to the orthogonally polarized wave output terminals 14a, 14b of orthomode transducer 14, while the axes X' and Y' represent the major axes of incident elliptically polarized waves 28 and 29, respectively, and the angle therebetween is not always equal to 90°. When the clockwise and counter-clockwise rotating elliptically polarized waves I and II as shown in FIG. 2a are applied to rotatable 180° phase-shifter 12, these polarized waves are subjected to coordinate conversion on the X-Y coordinate plane, so that the angle formed between the major axes as well as the axial ratio of the elliptically polarized waves are unchanged, but the major axes rotate and the sense of polarization rotation is reversed; polarized wave 30 indicated at I appearing as a counterclockwise rotating elliptically polarized wave and polarized wave 31 indicated at II appearing as a clockwise rotating elliptically polarized wave as shown in FIG. 2b, and they are fed to rotatable 90° phase-shifter 13. In this case, the 180° phase-shifter has its 180° phase shift leading plane set at $\pi$-axis 32 in FIG. 2a.

Figure 2C:
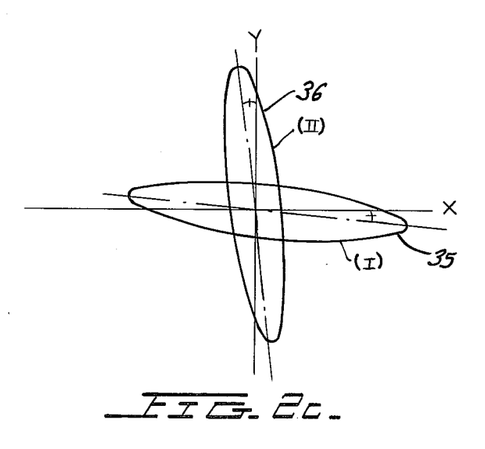

With respect to the elliptically polarized waves which have been coordinate-converted and shown at I and II, respectively, if the 90° phase shift leading plane of rotatable 90° phase shifter 13 is set at any arbitrary angle with respect to the X-axis as shown at 33 in FIG. 2b, then the incoming elliptically polarized waves are subjected to polarization conversion. As a result, to the input terminal of orthomode transducer 14 are fed elliptically polarized waves 35 and 36 having their major axes crossing obliquely as shown in FIG. 2c. And, in general, the elliptically polarized waves 35 and 36, respectively, have unequal cross-polarization components and the magnitudes of the cross-polarization components are not conditioned to be minimized. Therefore, if the aforesaid rotatable 180° phase-shifter 12 and 90° phase-shifter 13 are controlled and set, the polarization conversion can be made to maintain substantially the same polarization axial ratio, depolarizing the incoming polarized waves by the variable control of the angle formed between 90° phase advance plane 33 of said rotatable 90° phase-shifter 13 and the X-axis. This is the equalization of the angle between the major axis X' of the elliptically polarized wave 30 indicated at I in FIG. 2b and the 90° phase shift leading plane 33 of the rotatable 90° phase-shifter to the angle formed between the major axis Y' of elliptically polarized wave 31 indicated at II and the 0° plane 34 of the 90° phase-shifter. Then, the signal applied to the input terminal of orthomode transducer 14 involves obliquely crossed elliptically polarized waves 35 and 36 as shown in FIG. 2c. The cross-polarization components of these polarized waves become equal to each other, through the above process. This is the condition optimally to minimize cross-polarization response. In this case, in FIG. 2c the angle formed between the major axis of elliptically polarized wave 35 and the X-axis and the angle formed between the major axis of elliptically polarized wave 36 and the Y-axis are made equal to each other. The above-mentioned scheme implies that rotatable 180° phase-shifter 12 and rotatable 90° phase-shifter 13 have the function of compensating at least for the degradation of the cross-polarization discrimination caused by the differential phase shift characteristics of raindrops. Although the above description has been made on a static state basis, the rainfall rate would vary with time, so that if a method is provided for driving and controlling the 180° phase-shifter as well as the 90° phase-shifter so as to minimize and equalize in magnitude the cross-polarization components appearing at the two orthogonal output terminals of orthomode transducer 14, then automatic drive control would become possible.

Now the operations of 180° phase-shifter 12 and 90° phase-shifter, and the method for compensating arbitrary polarized waves by investigating the natures of the signals appearing at the two output terminals of orthomode transducer 14 and automatically deriving the control signals, will be explained hereunder.

Figure 4:
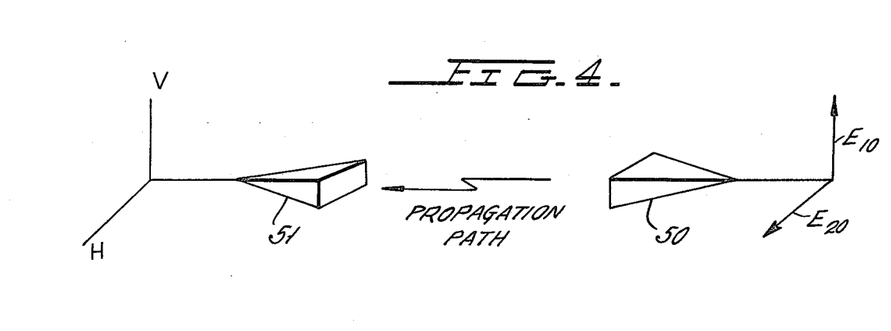
FIG. 4 is a perspective view showing the relation between a transmission path including transmitting and receiving antennas and dual polarized waves.

FIG. 4 shows the relation between a transmission path including a propagation space and transmitting and receiving antennas, and polarizations. More particularly, in a communication system model, one or more pilot signals having different frequencies are allocated to each polarization and are transmitted as carried by two polarized waves $E_{10}$ and $E_{20}$ in the same frequency band, then on the receiver side the crosstalk between two polarized waves caused by rainfall can be mitigated by detecting and processing said pilot signals and deriving control signals for rotatable phase shifters. Assuming that two orthogonal linear polarized waves $E_{10}$ and $E_{20}$ are transmitted from transmitting antenna 50, then in signals $E_V$ and $E_H$ appearing at orthogonal terminals of receiving antenna 51 would arise undesired crosstalk signals between two orthogonal polarizations due to differential phase shift and differential attenuation characteristics under a rain condition. This state of polarization can be represented generally by the following equations:

$$E_V = A_{11}E_{10} + A_{12}E_{20}$$
$$E_H = A_{21}E_{10} + A_{22}E_{20} \quad (1)$$

These equations can be rewritten in matrix form as follows:

$$\begin{bmatrix} E_V \\ E_H \end{bmatrix} = \begin{bmatrix} A_{11} & A_{12} \\ A_{21} & A_{22} \end{bmatrix} \begin{bmatrix} E_{10} \\ E_{20} \end{bmatrix} \quad (2)$$

The elements of this matrix generally take complex numbers, and $A_{11}$ and $A_{22}$ represent copolarization components, and $A_{12}$ and $A_{21}$ represent cross-polarization components. If this matrix M is further rewritten so as to separate the amplitude components and the phase components, then it is represented by the following equation (3):

$$M = \begin{bmatrix} a_{11}e^{j\phi_{11}} & a_{12}e^{j\phi_{12}} \\ a_{21}e^{j\phi_{21}} & a_{22}e^{j\phi_{22}} \end{bmatrix} \quad (3)$$

Where $a_{ij}$ and $\phi_{ij}$ ($i, j = 1,2$) represent amplitude and phase components, respectively, of the matrix elements. Since the generation level of cross-polarization can be represented by the polarization ratio, the cross-polarization components can be normalized via an AGC circuit by employing a phase-locked receiver, and therefore, equation (3) can be transformed to the following equation (4):

$$M = \begin{bmatrix} 1 & \frac{a_{12}}{a_{22}} e^{j(\phi_{12} - \phi_{22})} \\ \frac{a_{12}}{a_{22}} e^{j(\phi_{21} - \phi_{11})} & 1 \end{bmatrix} \quad (4)$$

More particularly, if the system is constructed as described later so that pilot signals involved in each transmitting polarized waves $E_{10}$, $E_{20}$ may be received by means of a phase-locked receiver and then normalized in an automatic gain control (AGC) circuit, 90° phase-shifter 13 and 180° phase-shifter 12 are controlled so as to minimize the amount of cross-polarization under the following condition:

$$\left. \begin{array}{l} \frac{a_{12}}{a_{22}} = \frac{a_{21}}{a_{11}} \\ \phi_{12} - \phi_{22} = \phi_{21} - \phi_{11} = \phi \end{array} \right\} \quad (5)$$

the states of the two polarized waves at the input terminals of orthomode transducer 14 can be brought to the optimum condition as shown in FIG. 2c. Here, the terms $(a_{12}/a_{22})e^{j\phi}$ and $(a_{21}/a_{11})e^{j\phi}$ represent residual crosstalk signals after the compensation of the differential phase shift caused by rain has been achieved by means of 90° phase-shifter 13 and 180° phase-shifter 12, which are mainly caused by the differential attenuation characteristics due to rain.

Figure 5:
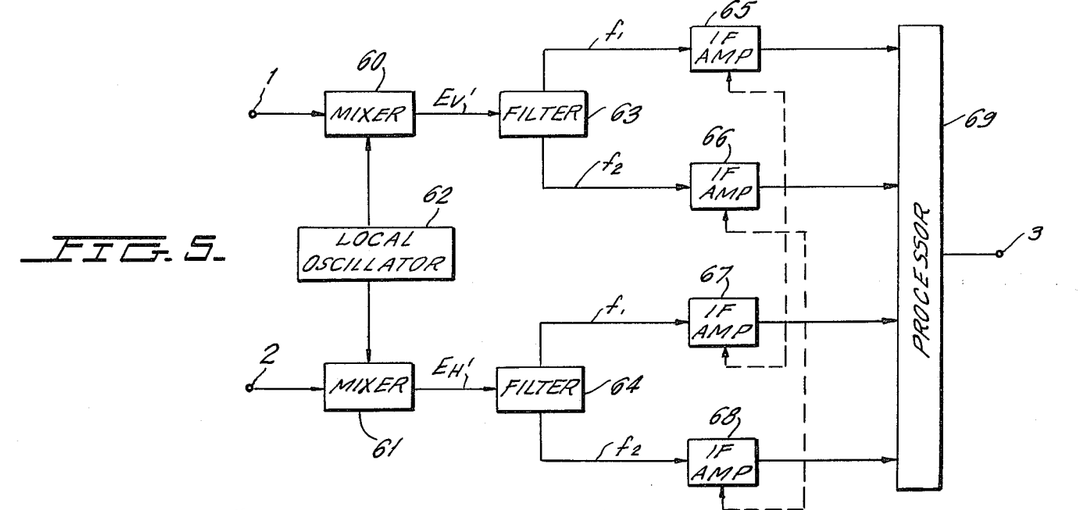
FIG. 5 is a more detailed block diagram of the control circuit 21 in FIG. 1.

FIG. 5 is a more detailed block diagram of the control circuit 21 in FIG. 1, in which signals for controlling the above-described 90° phase-shifter 13 and 180° phase-shifter 12 and also for controlling variable attenuators 22 and 23 and variable phase-shifters 24 and 25 are derived from the pilot signals. In this figure, reference numerals 1 to 3 designate input and output terminals corresponding to the terminals represented by the same numerals in FIG. 1, numerals 60 and 61 designate mixers; numeral 62, a local oscillator; numerals 63 and 64, filters; numerals 65 – 68, IF amplifiers each including AGC (automatic gain control) circuits respectively; and numeral 69 a processor. The signals applied via the input terminals 1 and 2 are converted into IF signals $E'_V$ and $E'_H$ in mixers 60 and 61, respectively. From one IF signal $E'_V$ are derived a copolarization component of a pilot signal having frequency $f_1$ and a cross-polarization component of another pilot signal having frequency $f_2$ via filter 63, and these components are fed to IF amplifiers 65 and 66, respectively. Similarly, from the other IF signal $E'_H$ are derived a cross-polarization component of the pilot signal having frequency $f_1$ and a copolarization component of the pilot signal having frequency $f_2$ via filter 64, and these components are fed to IF amplifiers 67 and 68, respectively. With regard to frequency $f_1$, the cross-polarization component signal of frequency $f_1$ is normalized as represented by equation (4) by means of the AGC circuit in amplifier 67 in accordance with the copolarization component signal from amplifier 65. Likewise, with regard to frequency $f_2$, the cross-polarization component signal of frequency $f_2$ is normalized by means of the AGC circuit in amplifier 66 in accordance with the copolarization component signal from amplifier 68. In this way, signals as represented by equation (4) are obtained from amplifiers 65 to 68, respectively, and these signals are further fed to processor 69 to derive signals for controlling the 90° phase-shifter 13, 180° phase-shifter 12 and compensation circuit 17. Processor 69 may typically comprise conventional phase detectors, amplitude detectors, and digital and/or analog devices which are capable of adding, subtracting, multiplying and dividing the various amplitude and phase values in a predetermined manner. Processor 69 serves the function of generating the necessary control signals for the rotatable 90° and 180° phase shifters 71 and 72, and attenuator and phase shifter assembly of compensation circuit 76.

When the cross-polarization components are compared in phase after the phase detection, the output of the phase detector can be used as the control signal for the 180° phase shifter 71. Similarly, the amplitude comparison provides the control signal for the 90° phase shifter 72. The attenuators and phase shifters in compensation network 76 are controlled by the voltage obtained from the residual crosstalk signals represented by the terms of $(a_{12}/a_{22})e^{j\phi}$ and $(a_{21}/a_{11})e^{j\phi}$. As explained above, the function of the processor 69 is to synthesize necessary control signals of variable elements by means of addition, subtraction, multiplication and division of the cross-polarization components obtained from the pilot signals, using phase-detecting devices.

Now the method for compensating the aforementioned residual cross-polarization components will be described. Representing the X-axis component of counterclockwise rotating elliptically polarized wave 35 shown at I in FIG. 2c by $E_{1C}$, the Y-axis component of the same by $E_{1X}$, the Y-axis component of the clockwise rotating elliptically polarized wave 36 shown at II by $E_{2C}$, and the X-axis component of the same by $E_{2X}$, then the electric field component detected at the X-axis polarized wave output terminal of orthomode transducer 14 is the sum of $E_{1C}$ and $E_{2X}$ (having a phase difference $\phi$ as defined above with respect to $E_{1C}$), and the electric field component detected at the Y-axis polarized wave output terminal of the same is the sum of $E_{2C}$ and $E_{1X}$ (having a phase difference $\phi$ as defined above with respect to $E_{2C}$). While $E_{1X}$ and $E_{2X}$ represent the magnitudes of cross-polarization generated by rainfall, they are the residual components caused by the relative loss difference of the rainfall remaining after the magnitudes of cross-polarization generated mainly by the differential phase shift due to rainfall have been compensated by the operations of said rotatable 180° and 90° phase-shifters.

Figure 2D:
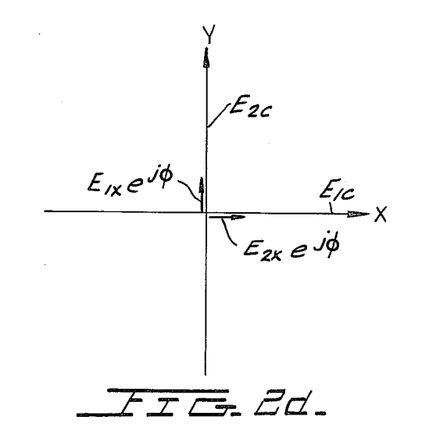

The above-described components $E_{1C}$, $E_{2C}$, $E_{1X}$ and $E_{2X}$ can be illustrated on the X–Y coordinates as shown in FIG. 2d. Among these electric field components, the electric field component $(E_{1C}+E_{2X})$ detected at the X-axis terminal of orthomode transducer and the electric field component $(E_{2C}+E_{1X})$ detected at the Y-axis terminal of orthomode transducer are, after amplification by pre-amplifiers 15 and 16 respectively, fed to the two input terminals of compensation circuit 17. Compensation circuit 17 is adapted to compensate the above-described crosstalk components $E_{1X}$ and $E_{2X}$, and the detailed operating principle is described hereunder. That is, when the signal $(E_{1C} + E_{2X})$ amplified by pre-amplifier 15 is fed to one input terminal of compensation circuit 17, at first this input signal is branched in accordance with an appropriate ratio by the branching circuit 18 in compensation circuit 17. This branched signal is passed through variable attenuator 22 and variable phase-shifter 24 in which the phase angle $\phi$ is controlled, and is then fed to branching circuit 19'. On the other hand, the signal $(E_{2C} + E_{1X})$ amplified by pre-amplifier 16 is, after passing through the branching circuit 18' in compensation circuit 17, fed to the same branching circuit 19'. If these two signals applied to the branching circuit 19' are synthesized after the phase and the amplitude of one signal have been variably controlled by variable attenuator 22 and variable phase-shifter 24 so as to offset the electric field $E_{1X}$ of the cross-polarization with an electric field having the same amplitude and the opposite phase, then in principle, an electric field proportional to $E_{2C}$ and not containing a cross-polarization component can be detected at the output terminal of compensation circuit 17.

In a substantially identical manner, with respect to the signal $(E_{2C} + E_{1X})$ amplified by pre-amplifier 16, when the signal branched by the branching circuit 18' in the compensation circuit 17 is passed through variable attenuator 23 and variable phase-shifter 25 and fed to branching circuit 19, if variable attenuator 23 and variable phase-shifter 25 are controlled so that this signal and the signal fed to the branching circuit 19 directly from the branching circuit 18 may be synthesized in the relation of equal amplitude and opposite phase with respect to the cross-polarization component $E_{2X}$, then at the output terminal of compensation circuit 17 is detected a voltage that is proportional to $E_{1C}$ and which does not contain the crosstalk component $E_{2X}$.

As described previously with reference to FIG. 5, the automatic control drive of the variable phase-shifters and the variable attenuators in the compensation circuit 17 can be achieved by generating in control circuit 21 signals representing phase difference information between the copolarization signal components $E_{1C}$ and $E_{2C}$ and cross-polarization signal components $E_{1X}$ and $E_{2X}$, the electric field ratio of the undesired signal to the desired signal, and the phase of the undesired signal relative to the desired signal, and by feeding back these signals to variable phase-shifters 24 and 25 and variable attenuators 22 and 23.

While the above explanation on the principle of operation has been made with respect to the case of linear polarized waves by way of example, with respect to the case of circular polarized waves the operation principle can also be explained with reference to the electric field vector diagrams in FIG. 3 on the basis of the block diagram in FIG. 1.

Figure 3A:
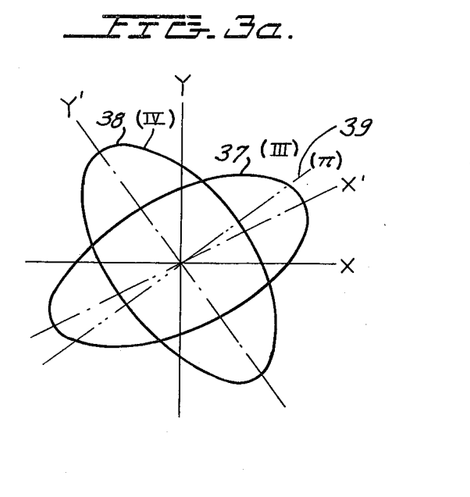

Assuming that perfect circular polarized waves rotating in the clockwise and counterclockwise directions, respectively, are transmitted from transmitting antenna 10, they would become elliptically polarized waves and their orthogonality would be disturbed because of the differential phase shift and differential attenuation characteristics of the rainfall in the propagation medium, so that a clockwise rotating elliptically polarized wave 37 indicated at III in FIG. 3a and a counterclockwise rotating elliptically polarized wave 38 indicated at IV are delivered to receiving antenna 11. The X'-axis and Y'-axis in this figure represent the major axes of the incoming elliptically polarized waves 37 and 38, respectively and the angle formed between these axes generally deviates from 90° because of the differential attenuation characteristics of the rainfall.

When the incoming elliptically polarized waves III and IV are fed to the rotatable 180° phase-shifter, not only is the sense of polarization rotation reversed, but a coordinate-conversion also takes place so that the axial ratio of two polarizations are unchanged, the polarized wave indicated at III becomes a counterclockwise rotating elliptically polarized wave while the polarized wave indicated at IV becomes a clockwise rotating elliptically polarized wave, and they appear at the output terminals of 180° phase-shifter 12 to be fed to 90° phase-shifter 13. Here, the 180° phase shift leading plane of the 180° phase-shifter is set at the $\pi$-axis 39 in FIG. 3a. With respect to the coordinate transformed elliptically polarized waves shown at III and IV, if the 90° phase shift leading plane of the 90° phase-shifter is set at 45° relative to the X-axis, then perfect circular polarized waves should be received, and the polarized waves subjected to polarization transformation would become elliptically polarized waves having small cross-polarization components of elliptically polarized waves having a large electric field component ratio of a major axis to a minor axis. However, this state of polarization does not satisfy the conditions for minimizing the cross-polarization components of the polarized waves shown at III and IV.

Figure 3B:
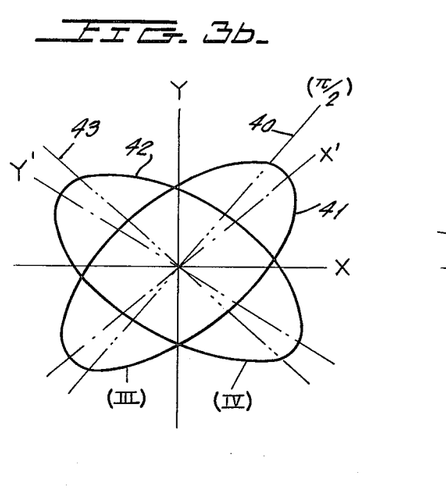
Figure 3C:
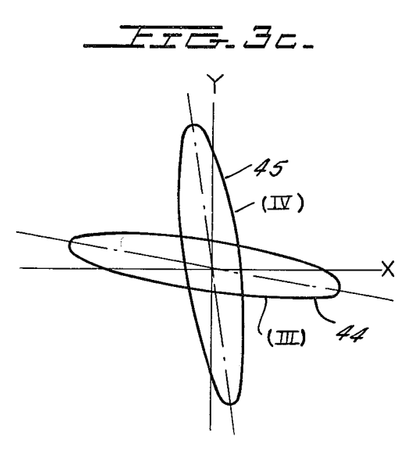

Therefore, if the 90° phase-shifter leading plane 40 of the 90° phase-shifter is deviated from the aforementioned 45° setting position as shown in FIG. 3b to set the 90° phase-shifter shifter at a particular angle so as to achieve polarization transformation into substantially the same elliptically polarized waves as the incoming elliptically polarized waves, and if the above-mentioned 180° phase-shifter 12 and 90° phase-shifter 13 are controlled and set at such angles that the angle formed between the major axis X' of polarized wave 41 shown at III and 90° phase advance plane 40 may become equal to the angle formed between the major axis Y' of polarized wave 42 shown at IV and 0° phase-shift plane 43, then the incoming polarized waves could be compensated and polarization-transformed at least with respect to the degradation of cross-polarization caused by the differential phase-shift of the rain drops. The above-mentioned setting conditions for 180° phase-shifter 12 and 90° phase-shifter 13 satisfy the condition for minimizing the cross-polarization components of the respective polarized waves, so that the input terminal of orthomode transducer 14 receives elliptically polarized waves 44 and 45 having small cross-polarization components as shown in FIG. 3c. The subsequent processing of the signals is exactly the same as that described in the section providing an planation of the linear polarized waves.

In the crosstalk reduction arrangement explained above, incident dual nonorthogonal polarizations with a different axial ratio are depolarized to recover nonorthogonal polarizations with the same axial ratio by the control of 90° and 180° phase-shifters in a feed circuit of an antenna, where the phase term $\phi$ is not always $\pi/2$. However, using the same configuration as FIG. 1, it is also possible to orthogonalize incident elliptically polarized nonorthogonal waves by the control of 90° and 180° phase-shifters. In this case, phase term $\phi$ is equal to $\pi/2$ and depolarized axial ratios of two polarizations are different from each other.

The explanation of the principle of the present invention has been made to clarify how the crosstalk generated in a propagation having abnormalities is compensated. Practically, the theoretical analysis and the experimental results show that the differential phase shift of rain drops is the dominant factor in the crosstalk interference caused by distortion of polarizations. Therefore, the phase terms of the polarization ratio designated by $\phi$ in equation (5) should become almost equal to $\pi/2$. Referring to FIG. 2d, it is clearly understood that the function of 90° and 180° phase-shifters connected in tandem in an antenna feed is to orthogonalize dual nonorthogonal polarizations and to depolarize incident polarizations. In this case, variable phase-shifters 24 and 25 in compensating network 17 may be preset at appropriate positions, and control signals for this purpose are unnecessary.

Figure 6:
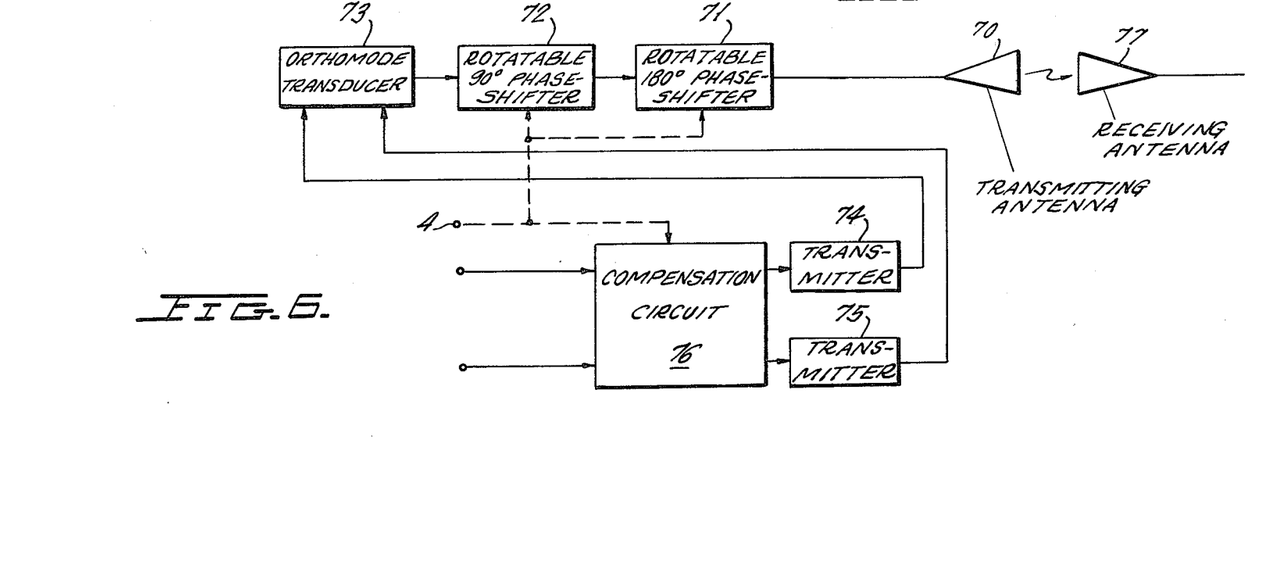
FIG. 6 is a block diagram of a compensation system in which the present invention is applied to the transmitting antenna side.

The present invention is not limited to the embodiment as shown in FIG. 1 in which the subject compensation system is applied to a receiving antenna side, but the modified embodiment as shown in FIG. 6 in which the subject compensation system is applied to the transmitting antenna side, is also deemed to involve an inventive concept based on the same principle. More particularly, this modification provides a compensation system such that in a communication system using the same frequency band both for transmission and reception as is the case with a microwave communication system, the polarized waves to be radiated are preset on the basis of the control signal derived from the received pilot signal by means of the rotatable phase-shifter, variable attenuator and variable phase-shifter of the transmitting antenna system in order to improve the crosstalk of the transmitting communication frequency caused by rainfall, and thereby the interference level between two orthogonal polarized wave signals incident on the opposite receiving antenna is suppressed to an acceptable level.

In the cross-polarization compensation system as shown in FIG. 6, in which rotatable 180° phase-shifter 71 and rotatable 90° phase-shifter 72 are connected to a transmitting antenna 70 and on the input terminal side of orthomode transducer 73 are disposed transmitters 74 and 75 and a compensation circuit 76, the signal obtained from the compensation circuit of the receiving antenna system in FIG. 1, that is, the control signal at output terminal 3 (FIG. 1) is applied to input terminal 4 (FIG. 6), and the amount of degradation of cross-polarization at the transmitting communication frequency caused by rainfall is preset on the transmitter side by controlling 180° phase-shifter 71, 90° phase-shifter 72 and compensation circuit 76 in accordance with the control signals, so that two elliptically nonorthogonal polarizations may be radiated from the transmitting antenna and said elliptically polarized waves may be compensated by the cross-polarization components generated by rainfall in the propagation path, whereby at the opposed receiving antenna 77 is produced an output signal having low crosstalk components.

In a satellite communication system, it is common practice to use a combined transmitting and receiving antenna having different frequency bands (for example, 6GHz and 4GHz bands) as an earth station antenna. In such a communication system in which signals in different frequency bands are transmitted and received, in view of the fact that the amounts of degradation of the cross-polarization caused by rainfall are different depending upon the frequency bands, for the purpose of mitigating the crosstalk at the transmitting communication frequency, a compensation system is known in which the control signal derived from the received pilot signals is simulated, and in accordance with said simulated signal, the rotatable phase-shifter, variable attenuator and variable phase-shifter in the transmitting system are preset to thereby control and suppress the interference level of the polarized waves arriving at the satellite antenna. One preferred embodiment of this system is illustrated in FIG. 7.

Figure 7:
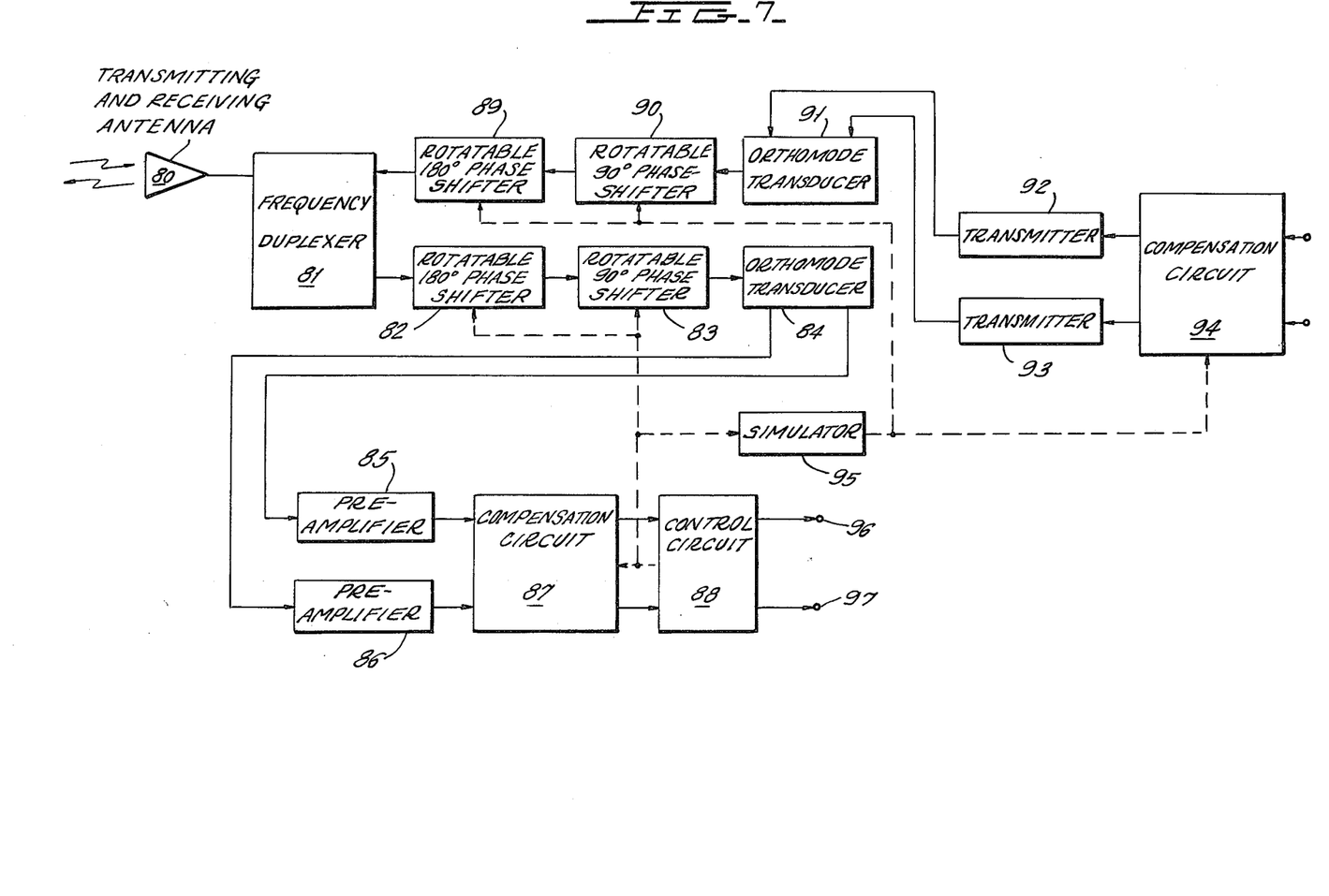
FIG. 7 is a block diagram of a compensation system according to the present invention in which a combined transmitting-receiving antenna is employed.

In FIG. 7, on a receiving wave output terminal side of frequency duplexer 81 for isolating a transmitting wave (for example, in the 6GHz band) and a receiving wave (for example, in the 4GHz band) of a combined transmitting and receiving antenna 80, are disposed rotationally controllable 180° phase-shifter 82, rotationally controllable 90° phase-shifter 83 and orthomode transducer 84, and to the output terminals of said orthomode transducer 84 is connected control circuit 88 via pre-amplifiers 85 and 86 and compensation circuit 87, to achieve cross-polarization compensation of the received signals on the basis of the operation principle as described previously with reference to FIG. 1. On the other frequency band, with regard to the transmitting wave, on the input terminal side of frequency duplexer 81 are disposed rotationally controllable 180° phase-shifter 89, rotationally controllable 90° phase-shifter 90 and orthomode transducer 91, and on the input terminal side of orthomode transducer 91 are connected transmitters 92 and 93 and compensation circuit 94 (which is identical to circuit 17 of FIG. 1) so that elliptically nonorthogonal polarizations may be radiated from antenna 80, whereby the amounts of cross-polarization generated in the propagation medium are compensated with each other and thus the polarized waves having restored orthogonality. Since the degree of degradation of the cross-polarization caused by the rainfall depends greatly upon the frequency bands of transmission and reception, simulator 95 is necessary to generate transmission band control signals for shifters 89 and 90 and compensation circuit 94. Simulator 95 may be made of a function generator capable of transforming received control signals into transmit control signals. The function may be performed in the analog mode or in the digital mode. The control signals are obtained as a function of the reception control signals relating to the differential phase and attenuation vs frequency characteristics for transmitting and receiving bands.

The principle of the present invention has been described above in connection with its perferred embodiments. The method for compensating cross-polarized waves as described above in which, among the cross-polarization components generted by the shape of rain drops, the component due to differential phase shift characteristics is compensated by controlling a rotatable 180° phase-shifter and 90° phase-shifter disposed in front of pre-amplifiers and the component due to differential attenuation characteristics is controlled and compensated by disposing a compensation circuit in a stage subsequent to the pre-amplifiers, has the following advantages:

The first advantage is that since a circuit for compensating orthogonality between polarized waves while giving appropriate loss to a signal is disposed in a stage following a pre-amplifier, in a system requiring an especially low-noise characteristic as is the case with satellite communication, an excellent compensation system having a small degradation of noise temperature can be provided.

The second advantage is that in general pre-amplifiers have finite amplitude and phase vs. frequency characteristics and since the crosstalk due to the differential phase-shift characteristics due to raindrops which is the predominant factor of the degradation of cross-polarization characteristics can be compensated in a stage preceding the pre-amplifier where the compensation of the crosstalk is not affected by the phase vs. frequency characteristics of the pre-amplifier, the high degree of crosstalk improvement in the cross-polarization effected by this polarized wave compensation system is achieved.

The third advantage is that, as proved in connection with the preferred embodiments of the compensation system according to the present invention, the subject compensation system is applicable to either communication systems employing circular polarized waves or those employing linear polarized waves without the need for replacement of any parts.

What is claimed is:

1. A crosstalk compensation system for communications systems using cross-polarized waves transmitted together with pilot signals; said system including a receiver comprising:
   a receiving antenna;
   means for adjusting the phase angle relationship between the cross-polarized waves connected to said receiving antenna;
   first and second signal paths;
   means coupled to said phase adjusting means for separating the cross-polarized waves and coupling the separated waves to respective ones of said signal paths;
   each of said signal paths including a combining circuit means;
   means in each signal path for extracting a portion of the signal in each signal path;
   attenuating means coupled between the extracting means of each signal path and the combining means of the other signal path for attenuating the extracted signal;
   each combining means combining the signal in its associated signal path with the attenuated signal from the attenuating means coupled thereto to remove the unwanted crosstalk component from the signal appearing at the output of each combining means;
   control means responsive to the outputs of said combining means for developing control signals for adjusting the attenuation level of said attenuating means and the phase shift applied to the received waves by the phase adjusting means.

2. The system of claim 1 further including preamplifier means coupled between said wave separation means and the first and second signal paths for amplifying said waves.

3. The system of claim 1 further comprising variable phase shifting means coupled between each attenuating means and combining means for making an additional phase adjustment upon the signals applied thereto to further attenuate the crosstalk components.

4. The system of claim 3 wherein said control means is coupled to said phase shifting means to adjust the level of phase shift imposed upon the signals processed by said phase shifting means.

5. A crossstalk compensation system as claimed in claim 1, wherein the phase adjusting means comprises a rotatable 180° phase shifter and a rotatable 90° phase shifter connected in cascade.

6. A crosstalk compensation system for communications systems using cross-polarized waves transmitted together with pilot signals, said system including a receiver comprising: a receiving antenna
   means for adjusting the phase angle relationship between the cross-polarized waves connected to said receiving antenna;
   first and second signal paths;

means coupled to said phase adjusting means for separating the cross-polarized waves and coupling the separated waves to respective ones of said signal paths to produce first and second signals;

means cross-coupled with said first and second signal paths for attenuating said first and second signals and means for combining the attenuated first and second signals with said second and first signals respectively to cancel the crosstalk components contained in said first and second signals and thereby produce third and fourth signals substantially free of crosstalk components;

control means responsive to the outputs of said cross-coupled means for developing control signals for adjusting the attenuation level of said cross-coupled means and the phase shift applied to the received waves by the phase adjusting means.

7. A crosstalk compensation system as claimed in claim 6, wherein the phase adjusting means comprises a rotatable 180° phase shifter and a rotatable 90° phase shifter connected in cascade.

8. In a microwave signal transmission system having at least first and second transmitter-receiver units arranged remote from one another and each having a transmitter and a receiver; each transmitter transmitting a pair of information signals with respective pilot signals through two separate microwave frequency carrier waves mutually cross-polarized and lying in the frequency region where phase and amplitude interferences tend to be caused between the carrier waves during the transmission; each of said receivers including a common signal path for the reception of said two separate carrier waves; said common path containing variable phase shift means operable in response to a control signal to impart a controlled phase shift to said two carrier waves; each of said receivers further including two separate signal paths for conducting respective ones of said two separate carrier waves coupled to said common signal path and to said variable phase shift means; each of said two separate signal paths including respective first and second amplifier means; and compensation circuit means connected to said first and second amplifier means for extracting and processing said respective pilot signals and to generate said control signal responsive to a difference in said pilot signals due to interference between said two separate carrier waves; first means connecting said control signal to said variable phase shift means to cause said phase shift means to phase shift said two carrier waves in said common signal path to reduce the phase interference between said two carrier waves; and second means for connecting said control signal to said first and second amplifier means to reduce the amplitude interference between said two carrier waves.

9. The interference eliminating system as claimed in claim 8, wherein said phase-shifting means comprises a rotatable 180° phase shifter and a rotatable 90° phase shifter, connected in cascade.

10. The system of claim 8, wherein the transmitter of at least one of said transmitter-receiver units further comprises second variable phase shift means responsive to said control signal for changing the transmitted carrier wave amplitudes and means connected to said transmitter and responsive to said control signal for changing the polarization angle between the carrier waves whereby the interference between carrier waves transmitted by said transmitter is reduced.

11. The system of claim 10, wherein said two separate carrier waves have signficiantly different frequencies.

12. The system of claim 8, wherein the angle difference in polarization between said two carrier waves transmitted from the transmitter is 90°.

* * * * *